(12) United States Patent
Mottershead

(10) Patent No.: US 10,794,614 B2
(45) Date of Patent: Oct. 6, 2020

(54) THERMOSIPHON SYSTEM FOR HOT WATER HEATER

(71) Applicant: Bernard J. Mottershead, Federal Way, WA (US)

(72) Inventor: Bernard J. Mottershead, Federal Way, WA (US)

(*) Notice: Subject to any disclaimer, the term of this patent is extended or adjusted under 35 U.S.C. 154(b) by 107 days.

(21) Appl. No.: 16/256,281

(22) Filed: Jan. 24, 2019

(65) Prior Publication Data

US 2019/0170399 A1 Jun. 6, 2019

Related U.S. Application Data

(62) Division of application No. 15/346,071, filed on Nov. 8, 2016, now Pat. No. 10,215,445.

(60) Provisional application No. 62/351,169, filed on Jun. 16, 2016, provisional application No. 62/271,093, filed on Dec. 22, 2015.

(51) Int. Cl.

| | |
|---|---|
| *F24H 9/20* | (2006.01) |
| *F24H 9/12* | (2006.01) |
| *F24H 9/00* | (2006.01) |
| *F28D 20/00* | (2006.01) |
| *F28D 7/10* | (2006.01) |
| *F24H 1/18* | (2006.01) |
| *F24H 1/20* | (2006.01) |

(52) U.S. Cl.
CPC ......... *F24H 9/2007* (2013.01); *F24H 9/0015* (2013.01); *F24H 9/12* (2013.01); *F24H 9/124* (2013.01); *F28D 7/106* (2013.01); *F28D 20/0034* (2013.01); *F24H 1/18* (2013.01); *F24H 1/20* (2013.01); *F24H 1/201* (2013.01); *F24H 9/0005* (2013.01); *F28D 2020/0069* (2013.01)

(58) Field of Classification Search
CPC ... F24H 1/18; F24H 1/20; F24H 1/201; F24H 9/0005; F24H 9/0015; F24H 9/12; F24H 9/124; F24H 9/2007; F28D 7/106; F28D 20/0034; F28D 2020/0069
USPC ........................ 122/14.3, 19.1, 235.29, 408.1
See application file for complete search history.

(56) References Cited

U.S. PATENT DOCUMENTS

| | | |
|---|---|---|
| 820,282 A | 5/1906 | Brown |
| 985,344 A | 2/1911 | Harvie |
| 1,050,038 A | 1/1913 | O'Malley |
| 1,451,863 A | 4/1923 | Clark |
| 1,473,036 A | 11/1923 | Greenham |
| 1,519,594 A | 12/1924 | Shoemaker |
| 1,536,989 A * | 5/1925 | Trageser ................. F24H 1/186 122/19.1 |

(Continued)

FOREIGN PATENT DOCUMENTS

| | | |
|---|---|---|
| CA | 2422932 | 2/2004 |
| GB | 372497 | 5/1932 |
| GB | 487876 | 6/1938 |

*Primary Examiner* — Steven B McAllister
*Assistant Examiner* — Benjamin W Johnson
(74) *Attorney, Agent, or Firm* — R. Reams Goodloe, Jr.

(57) ABSTRACT

A thermosiphon system for hot water heaters. In an embodiment, the thermosiphon includes a multi-tubular structure which in an embodiment is insertable through the cold water connection in a hot water tank in order to provide for a thermosiphon action in the hot water heater, to keep water circulating and prevent temperature stratification of water in the tank. In another embodiment, a thermosiphon design is fabricated within a water heater tank at the factory.

8 Claims, 5 Drawing Sheets

(56) References Cited

U.S. PATENT DOCUMENTS

| | | | |
|---|---|---|---|
| 1,583,342 | A | 5/1926 | Dlugosch |
| 1,643,673 | A | 9/1927 | Merrill |
| 1,779,667 | A | 10/1930 | Fazekas |
| 1,863,273 | A | 6/1932 | Hofferbert |
| 2,012,101 | A | 8/1935 | Hynes |
| 2,066,190 | A | 12/1936 | Swars |
| 2,308,765 | A | 1/1943 | Mango |
| 2,375,871 | A | 5/1945 | Reifenberg |
| 2,376,537 | A | 5/1945 | Hall |
| 2,784,291 | A | 3/1957 | Harney |
| 2,804,534 | A | 8/1957 | Coates |
| 3,503,384 | A | 3/1970 | Matarazzo et al. |
| 3,546,429 | A | 12/1970 | Fleet |
| 4,103,319 | A | 7/1978 | Crain et al. |
| 4,403,137 | A | 9/1983 | Glazer |
| 4,440,217 | A * | 4/1984 | Stieler .............. F28D 7/106 165/143 |
| 4,461,347 | A * | 7/1984 | Layton .............. F28D 7/106 138/114 |
| 4,587,401 | A | 5/1986 | Ekman |
| 4,777,347 | A | 10/1988 | Mottershead |
| 5,499,621 | A | 3/1996 | Trihey |
| 6,370,328 | B1 | 4/2002 | Mottershead |
| 7,055,339 | B2 | 6/2006 | Hebert |
| 7,203,418 | B1 | 4/2007 | York et al. |

\* cited by examiner

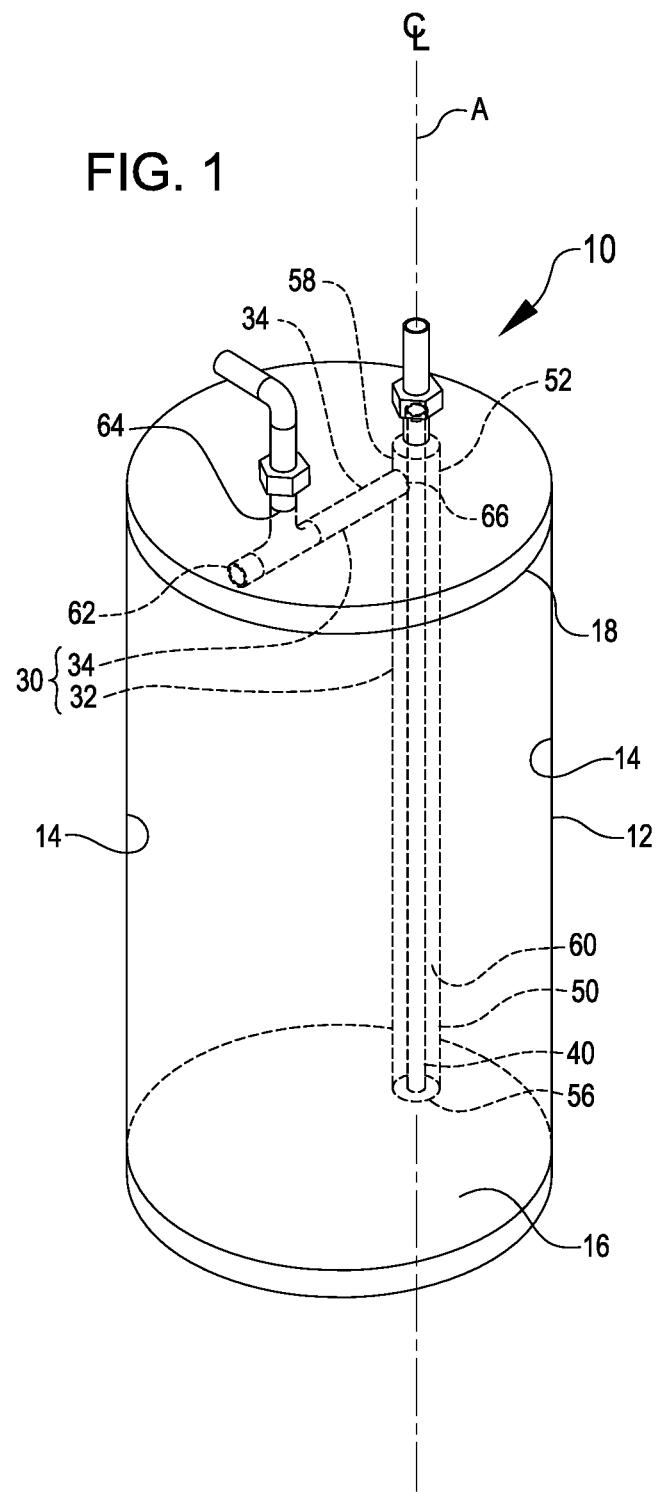

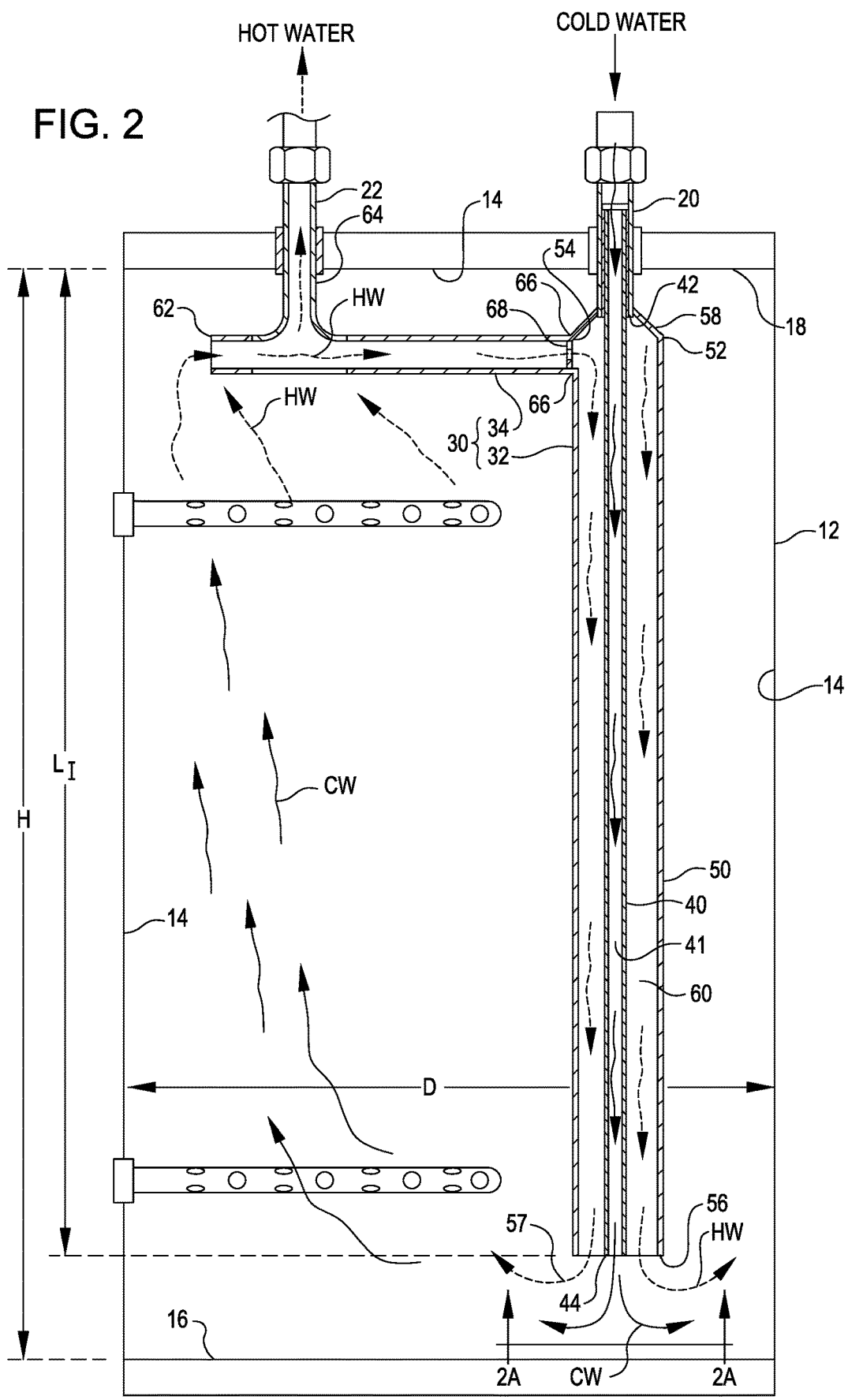

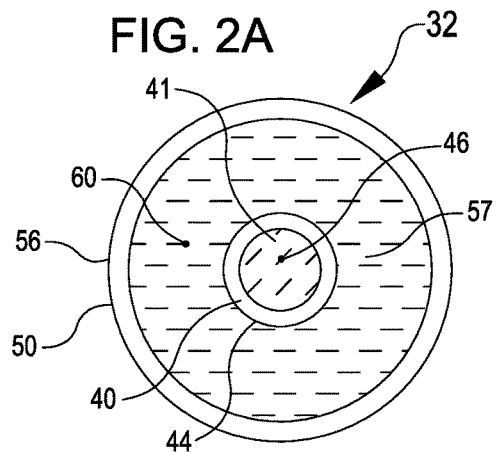
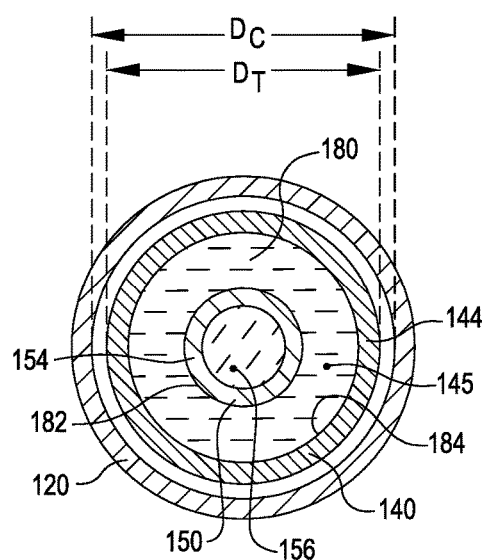
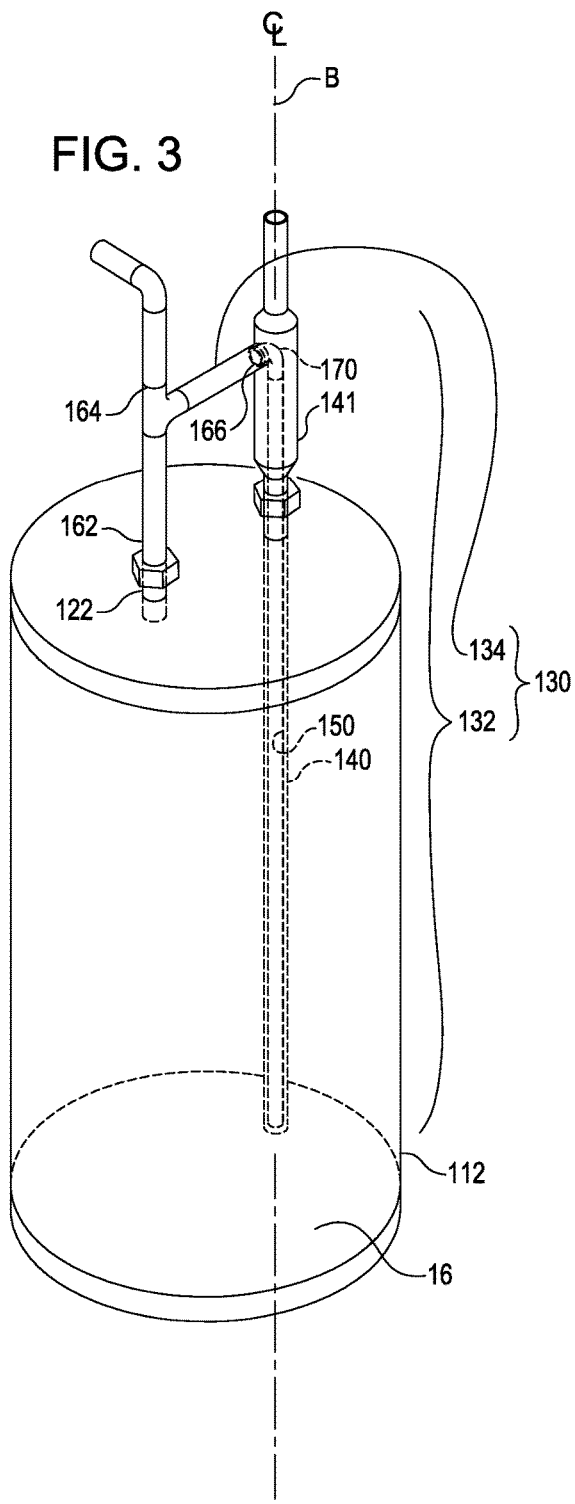

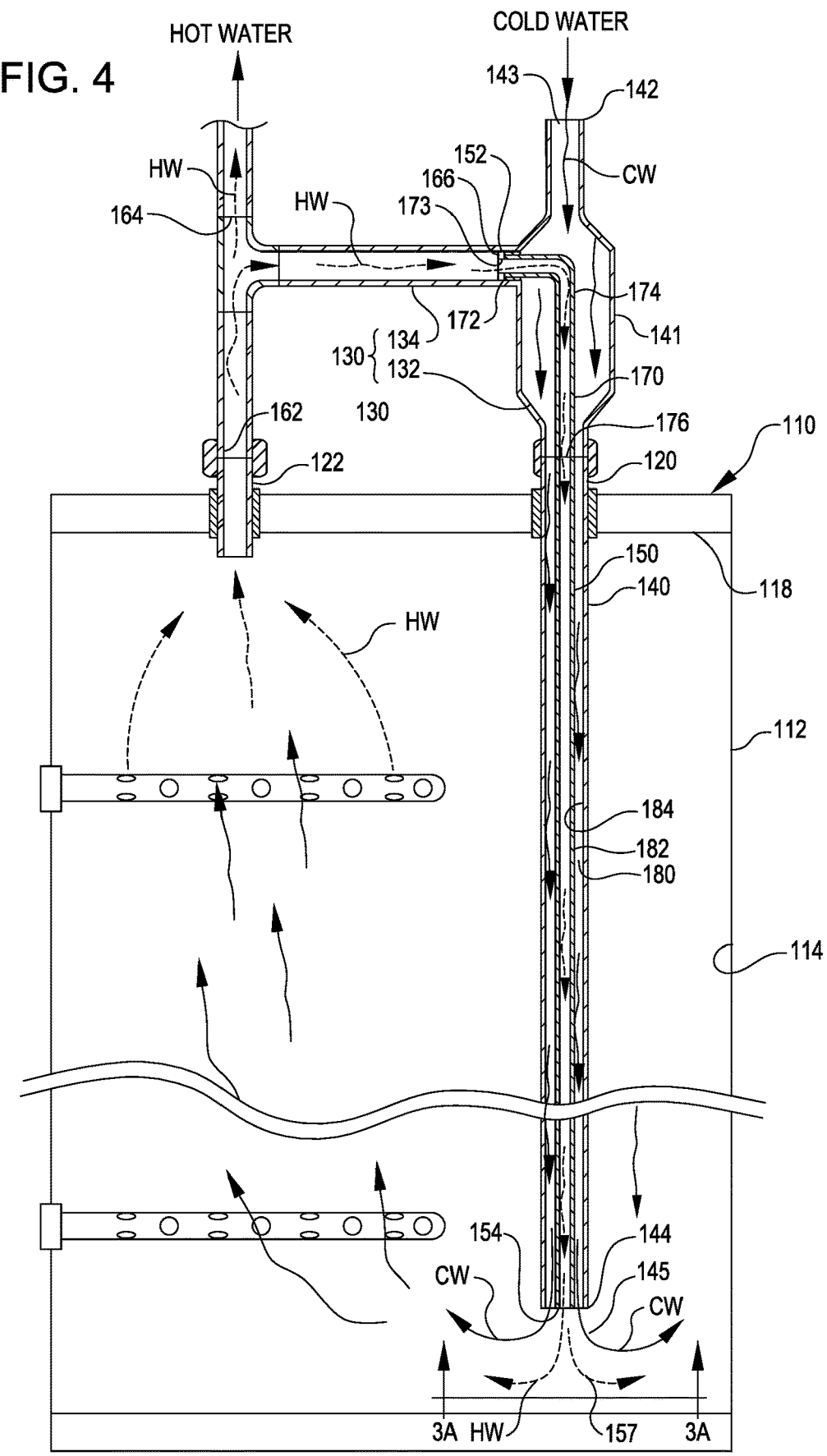

THERMOSIPHON SYSTEM FOR HOT WATER HEATER

RELATED PATENT APPLICATIONS

This application is a divisional and claims priority under 35 USC § 121 of prior and now pending U.S. patent application Ser. No. 15/346,071 filed Nov. 8, 2016, which application claimed priority under 35 USC § 119(e) from U.S. Provisional Patent Application Ser. No. 62/351,469, filed Jun. 16, 2016 and U.S. Provisional Patent Application Ser. No. 62/271,093, filed Dec. 22, 2015 entitled THERMOSIPHON SYSTEM FOR HOT WATER HEATER, the disclosures of each are incorporated herein in their entirety, including the specification drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to hot water heaters, particularly those designed and sized for residential or light commercial use, and to improving energy efficiency and to reducing biological contamination in such water heaters.

BACKGROUND

A continuing need exists for improvements in residential hot water systems, in order to reduce energy usage. Also, it would be advantageous if biological growth experienced in such systems were substantially reduced or eliminated. Further, it would be advantages if such improvements were available either in a "built-in" form and integrally provided with a new water heater, or in an "add-on" form, suitable for either retrofit or in combination with a new water heater.

Further, although I have previously disclosed various attempts at such improvements, by continuing to work in the field, I have discovered that further refinement of the basic concept of use of thermosiphons in water heaters would be yet further advantageous. In U.S. Pat. No. 4,777,347, issued to B. J. Mottershead on Oct. 11, 1988, and entitled Electric Water Heating Tank with Thermosiphonic Circulation for Improved Heat Recovery Rate, I disclosed the concept of the use of a liquid loop external to a water heater tank as being helpful in improving the heat recovery rate in hot water heaters. In U.S. Pat. No. 6,370,328 B1, issued to B. J. Mottershead on Apr. 9, 2002, and entitled Water Heating Tank with Thermosiphonic Circulation for Improved Heat Recovery Rate, I disclosed the concept of the use of an internal liquid loop circulation pipe in a water heater tank, coupled with a check valve between the hot water outlet and the cold water inlet, as being helpful in improving the heat recovery rate in hot water heaters. The disclosures of each of those prior United States patents are incorporated herein in their entirety by this reference.

A common problem encountered with my prior art devices when use was attempted in various new or retrofit construction settings is that the concepts required apparatus not normally provided either as an integral component of a hot water heater, or as a readily available and easily installable add-on component to a hot water tank installation. Thus, such prior art hot water tank thermosiphonic circulation devices inevitably present difficulty to plumbers or to the general public with respect to implementing an improved, more efficient hot water system.

Thus, there remains a continuing unmet need for (a) a hot water tank design which includes, factory build in a tank, a reliable thermosiphon configuration, and alternately, (b) a thermosiphon apparatus design which is easily can be easily retrofitted to existing hot water heaters, or added at time of construction to new hot water tank installations.

SOME OBJECTS, ADVANTAGES, AND NOVEL FEATURES

Accordingly, one objective of my invention is to provide a design for a thermosiphon which is simple, straightforward, and which is sized and shape for addition to existing hot water heaters.

Another objective of my invention is to provide a design for a thermosiphon which may be easily installed in new hot water tank systems.

Another important objective is to provide a hot water heater in which a reliable thermosiphon is built into the hot water heater at the factory, so that the hot water heater always enjoys the benefit of higher heat recovery rate, higher efficiency.

A related and important objective is to provide a hot water heater design which in normal use minimizes or eliminates biological contamination.

A related and important objective is to provide a retrofitable thermosiphon design which includes a multi-tubular structure that is sized and shaped so that it can be easily inserted into a hot water tank utilizing industry standard cold water inlet plumbing connections.

Another important objective is to provide an easily assembled thermosiphon kit that can be easily installed by competent and experienced plumbers in existing residential hot water systems.

Finally, another important objective is to provide a high quality thermosiphon system design which can be conveniently and easily built with conventional manufacturing processes, so that manufacturing costs are minimized.

SUMMARY

I have now invented an improved thermosiphon system for use with hot water heaters, and in particular, for hot water heaters configured for residential or light commercial water heating service. These improvements are important since they improve energy efficiency in hot water heaters and improve their heat recovery rate. Also, continuous recirculation of water in a hot water tank by way of an internal thermosiphon, or an external thermosiphon, as taught herein, is important since it effectively eliminates temperature stratification in hot water heaters, especially as may occur during periods of low or non-use of hot water, and thus minimizes or effectively eliminates the occurrence of biological growth in inside the tanks of hot water heaters.

One embodiment of my thermosiphon system is for use internal to the tank of a hot water heater. The combination of a water heater and an internal thermosiphon includes a tank with sidewalls defining an internal space of height H between a bottom portion and a top portion, and a thermosiphon. The hot water heater tank is adapted to be normally filled with water to be heated. The tank includes a cold water inlet in the top portion, and a hot water outlet in the top portion. The thermosiphon may be provided with components including a multi-tubular structure disposed along a longitudinal axis internal to the tank. Such internal thermosiphon designs may utilize a cold water tube extending between an upstream end and a downstream end, with the upstream end fluidly connected to the cold water inlet in the top portion of the tank, and with the downstream end open and adapted for discharge of water therefrom. Such an internal thermosiphon design may also include a hot water tube which is spaced outwardly from and situated longitudinally along at least a portion of the cold water tube. Such a hot water tube may extend between a hot water inlet end having a hot water inlet, and a hot water output end which is open and adapted for discharge of water therefrom. The hot water tube may further include an inlet cap substantially sealed to the cold water tube at a location adjacent to the cold water inlet. In an embodiment, the multi-tubular structure in the thermosiphon may be provided in the form of a pair of concentric tubes nested about the longitudinal axis, so that the cold water tube provides a centrally located cold water passageway, and wherein the hot water tube is spaced outwardly from the cold water tube, so that an annular hot water passageway is provided between the cold water tube and the hot water tube. Such a thermosiphon design may further include a hot water collection tee within the tank, where the hot water collection tee has a tee inlet, a first outlet fluidly connected to the hot water outlet in the top portion of the tank, and a second outlet fluidly connected to the hot water inlet of the multi-tubular structure. In various internal thermosiphon embodiments, the multi-tubular structure may have a length $L_I$ inside the tank and along the longitudinal axis which is up to seventy five percent (75%) of the internal height H available within the tank.

Another embodiment of my thermosiphon system is configured for use external to the tank of a hot water heater. Typical water heaters for residential or light commercial use may have a tank with internal sidewalls defining an internal space of height H. Such tanks are adapted to be normally filled with water for heating of the water. Based on various local, state, or national plumbing or building code requirements, the tanks have a top portion with (1) a cold water inlet of internal diameter $D_C$ and (2) a hot water outlet. In many code compliant designs, the cold water inlet and hot water outlet may be provided using a male pipe fitting welded or otherwise secured to the tank at one end, and having ¾ inch NPT (National Pipe Thread Taper) threads ready for use with conventional pipe fittings.

In any event, a thermosiphon having a multi-tubular structure disposed along a longitudinal axis may be provided for insertion through the cold water inlet of hot water tank. In such a configuration, the multi-tubular structure may have an overall diameter $D_T$, which is less than the internal diameter $D_C$ of the cold water inlet, so that the multi-tubular structure is insertable through the cold water inlet and thus into the tank. The multi-tubular structure may include a hot water tube extending between a siphon inlet and a siphon exit. The siphon exit adapted for discharge of water therefrom. In such design, a cold water tube may be provided spaced outwardly from and situated longitudinally along at least a portion of the hot water tube. The cold water tube extends between a cold water inlet end having a cold water inlet, and a cold water output end which is open and adapted for discharge of water therefrom. The apparatus further includes an external hot water T, which has a hot water T inlet fluidly attachable to the hot water outlet in the tank for receiving hot water therefrom, and a hot water T outlet for discharge of hot water to be used outward therefrom, and a hot water T siphon outlet, for providing hot water to the hot water tube of the multi-tubular structure. At the juncture of the hot water T siphon outlet and the cold water inlet tube to the multi-tubular structure, a transition tube is provided. The transition tube has a hot water inlet configured to receive a supply of hot water from the hot water T siphon outlet and direct the supply of hot water to the hot water tube.

In an embodiment, the transition tube may include (1) an inlet flange fluidly sealed with respect to the hot water T siphon outlet (at the outside of the flange) and to the transition tube (at the inside of the flange). A bend portion is provided to change the direction of a hot water stream to connect with the hot water tube. A transition tube outlet is provided. The transition tube outlet has sidewalls defining a hot water receiving passageway for receiving hot water from the hot water T siphon outlet and delivering hot water to the hot water tube. In an embodiment, the multi-tubular structure includes a pair of concentric tubes nested about said longitudinal axis, wherein the hot water tube provides a centrally located hot water passageway, and wherein a cold water tube is spaced outwardly from the hot water tube, to provide annular cold water passageway between an outer wall of the hot water tube and an inner wall of the cold water tube. In various embodiments, the multi-tubular structure of the thermosiphon may have a length $L_I$ that is inserted inside the tank where the length $L_I$ is greater than about 75% of the inside height H of the tank.

BRIEF DESCRIPTION OF THE DRAWING

The present invention(s) will be described by way of exemplary embodiments, using for illustration the accompanying drawing in which like reference numerals denote like elements, and in which:

FIG. 1 is a perspective of for an embodiment in which a thermosiphon is provided within a hot water tank.

FIG. 2 is a conceptual vertical cross sectional view of an embodiment such as just illustrated in FIG. 1, where a thermosiphon is provided inside a hot water tank; those of skill in the art need not be provided with detailed mechanical details such as might be useful in assembly of threaded pipe or fabrication by brazing or welding components as illustrated in this or other figures of the drawing.

FIG. 2A is an end view, of a multi-tubular thermosiphon, taken looking up at the location 2A-2A as indicated in FIG. 2.

FIG. 3 is a perspective of for an embodiment in which a thermosiphon is provided separately and externally from a hot water tank; however, it should be appreciated that the multi-tubular structure component of the thermosiphon is configured for insertion though the cold water inlet to the tank, and extends downward into the tank upon assembly.

FIG. 3A is an end view, of an insertable multi-tubular thermosiphon, taken looking up at the location 3A-3A as indicated in FIG. 4.

FIG. 4 is a conceptual vertical cross sectional view of an embodiment such as just illustrated in FIG. 3, where a thermosiphon is provided for external insertion into a hot water tank.

Figure 5:
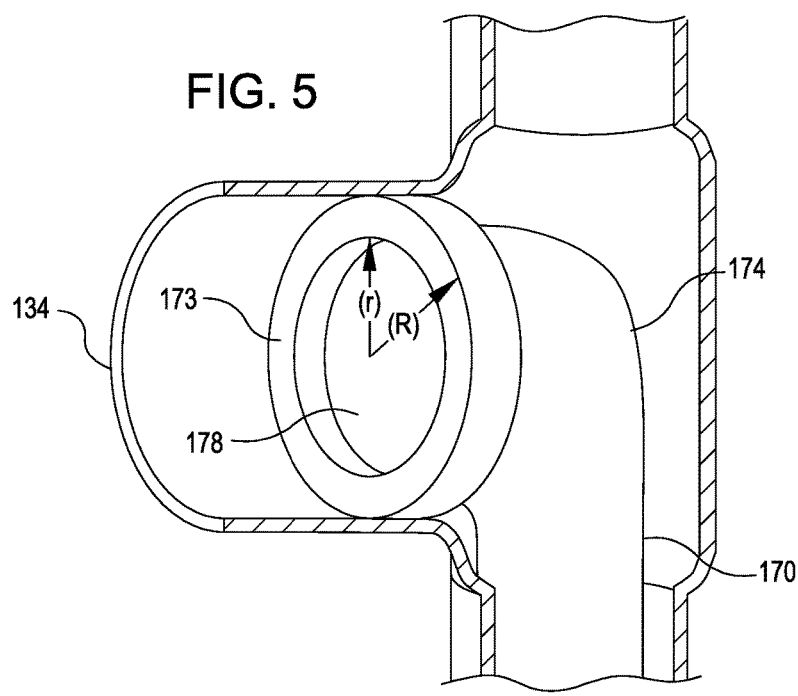
FIG. 5 is front perspective, partial cross-sectional view of a transition tube, showing a portion of the hot water T siphon outlet, an inlet flange fluidly sealed at the outer rim thereof to the inside of the hot water T siphon outlet, and fluidly sealed at the inner rim thereof to the outside of the inlet of the transition tube, as well as showing the bend portion which directs hot water to the hot water tube.

The foregoing figures, being merely exemplary, contain various elements that may be present or omitted from a final configuration for an embodiment of a thermosiphon system for use with a hot water heater, or that may be implemented in various embodiments described herein for use either internally to, or assembled externally for use with, a hot water heater. Other variations in thermosiphon systems for hot water heaters may use slightly different mechanical structures, mechanical arrangements, or size and shape of components, and yet employ the principles described herein and as generally depicted in the drawing figures provided, and as more specifically called out in the claims set forth below. An attempt has been made to draw the figures in a way that illustrates at least those elements that are significant for an understanding of an exemplary thermosiphon system for use with hot water heaters, and suggestive embodiments for different approaches to using thermosiphonic devices with hot water heaters.

It should be understood that various features may be utilized in accord with the teachings hereof, as may be useful in different embodiments as useful for various sizes and shapes of thermosiphon structures for hot water heaters, depending upon the specific requirements (such as typical height of a hot water heater tank) within the scope and coverage of the teachings herein as defined by the claims. Further, like features in various embodiments for thermosiphon system designs may be described using like reference numerals, or other like references, without further mention thereof.

DETAILED DESCRIPTION

Attention is directed to FIG. 1, where a water heater 10 having an internal thermosiphon is illustrated. In an embodiment, the provision of these elements, factory built, is an important improvement in the art. Hot water heater 10 includes a tank 12 with internal sidewalls 14 defining an internal space of height H (see FIG. 2) between a bottom portion 16 and a top portion 18. The hot water tank 10 adapted to be normally filled with water, which is not separately illustrated. However, generally, arrows representing cold water are shown with arrows having tails with solid lines—see reference CW in FIG. 2. Likewise, arrows representing hot water are shown with arrows having tails with broken lines—see reference HW in FIG. 2. The tank 12 includes cold water inlet 20 in the top portion 18. A hot water outlet 22 is provided in the top portion.

A thermosiphon 30 system is provided within tank 12. The thermosiphon system includes multi-tubular structure 32 and a hot water collection tee 34. The hot water collection tee 34 has a tee inlet 62, a first outlet 64 fluidly connected to the hot water outlet 22 in said top portion 18, and a second outlet 66 fluidly connected to a hot water inlet 42 on the multi-tubular structure 32.

In an embodiment, a multi-tubular structure 32 may be located internal to the tank 12 and disposed along a longitudinal axis which is identified in FIG. 1 as centerline of axis A. In an embodiment the longitudinal axis of multi-tubular structure 32 may be parallel to the vertical axis of the water heater 10 (usually the same as vertical sidewalls of tank 12) in which the multi-tubular structure 32 is fabricated. The multi-tubular structure 32 of the thermosiphon 30 includes a cold water tube 40 extending between an upstream end 42 and a downstream end 44. The upstream end 42 is fluidly connected to the cold water inlet 20 in the top portion 18. The downstream end 44 is open (see FIGS. 2 and 2A) and adapted for discharge of cold water 46. A hot water tube 50 is provided. The hot water tube 50 is spaced outwardly from and situated longitudinally along at least a portion of the cold water tube 40. The hot water tube 50 extends between a hot water inlet end 52 having a hot water inlet 54, and a hot water output end 56 which is open and adapted for discharge of hot water 57 therefrom. The hot water tube 50 may further include an inlet cap 58 substantially sealed to the cold water tube 40 adjacent the cold water inlet 20.

As better seen in FIG. 2A, the multi-tubular structure 32 may be fabricated in the form of a pair of concentric tubes nested about the longitudinal axis A. In an embodiment as shown in FIGS. 1, 2, and 2A, the cold water tube 40 provides a centrally located cold water passageway 41. In such embodiment, the hot water tube 50 is spaced outwardly from the cold water tube 40, thus providing an annular hot water passageway 60 between the cold water tube 40 and the hot water tube 50.

In an embodiment, the hot water collection tee 34 is also located within the tank 12 of water heater 10. The hot water collection tee 34 includes a tee inlet 62, a first outlet 64 fluidly connected to the hot water outlet 22 in the top portion 18, and a second outlet 66 fluidly connected through orifice 68 which may be provided in an annular disk configuration having an outer radius (R) and an inner radius (r) so that it also serves as an orifice through which how water HW enters the hot water inlet 54 in the hot water tube 50.

In various embodiments, the multi-tubular structure 32 has a length $L_I$ inside the tank 12 (see FIG. 2) along the longitudinal axis A, and the length $L_I$ is greater than fifty percent (50%) of the inside height H of tank 12.

In various embodiments, the multi-tubular structure 32 has a length $L_I$ inside the tank 12 (see FIG. 2) along the longitudinal axis A, and the length $L_I$ is greater than seventy-five percent (75%) of the inside height H of tank 12.

In various embodiments, the multi-tubular structure 32 has a length $L_I$ inside the tank 12 (see FIG. 2) along the longitudinal axis A, and the length $L_I$ is greater than ninety percent (90%) of the inside height H of tank 12.

In various embodiments, the tank 12 may be provided as a cylindrical tank having an internal diameter D, and wherein height H is greater than diameter D.

Figure 6:
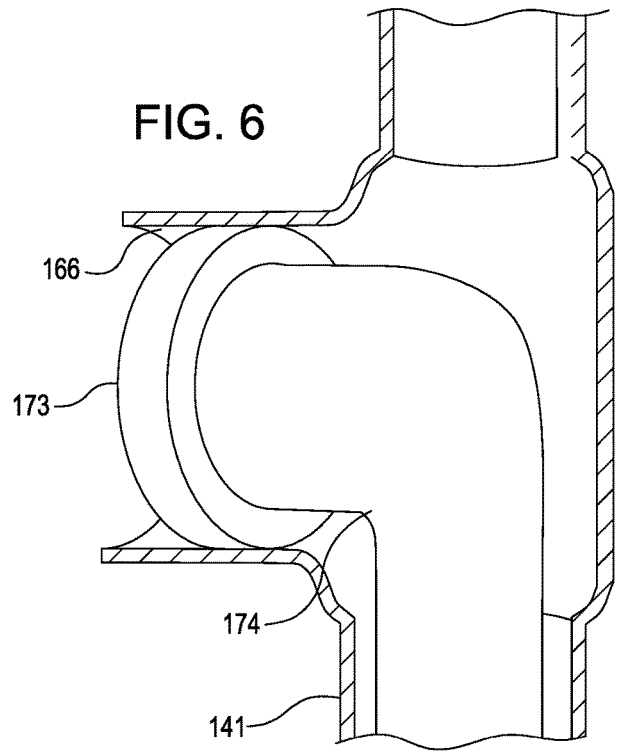
FIG. 6 is rear perspective, partial cross-sectional view of a transition tube, showing a portion of the hot water T siphon outlet, an inlet flange fluidly sealed at the outer rim thereof to the inside of the hot water T siphon outlet, and the inlet flange fluidly sealed at the inner rim thereof to the outside of the inlet of the transition tube, as well as showing the bend portion which directs hot water to the hot water tube.

Attention is now directed to FIGS. 3, 3A, 4, 5, and 6, where another embodiment for a thermosiphon 130 is illustrated. A thermosiphon 130 includes a multi-tubular structure 132 sized and shaped for use in combination with a residential water heater 110 having a tank 112 with internal sidewalls 114 defining an internal space of height H. The tank 112 is adapted to be normally filled with water for heating of the water. The tank 112 has a top portion 118 with a cold water inlet 120 of internal diameter $D_C$ and a hot water outlet 122.

The thermosiphon includes a multi-tubular structure 132 and an external hot water T 134. The multi-tubular structure 132 may be disposed along a longitudinal axis B and have an overall diameter $D_T$. In order to size and shape the multi-tubular structure 132 so that the multi-tubular structure 132 is insertable through the cold water inlet 120 and thence into the tank 112, the multi-tubular structure 132 must have a diameter $D_T$ less than the inside diameter $D_C$ of the cold water inlet 120, as illustrated in FIG. 3A.

The multi-tubular structure 132 includes a hot water tube 150 extending between a siphon inlet 152 and a siphon exit 154. The siphon exit 154 adapted for discharge of hot water 157 therefrom. The multi-tubular structure also includes a cold water tube 140. The cold water tube 140 is spaced outwardly from and situated longitudinally along at least a portion of the hot water tube 150. The cold water tube 140 extends between a cold water inlet end 142 having a cold water inlet 143, and a cold water output end 144 which is open and adapted for discharge of cold water 145 therefrom.

An external hot water T 134 is provided for hot water HW return from the tank 112 to the multi-tubular structure 132 of thermosiphon 130. The external hot water T 134 includes a hot water T inlet 162 fluidly attachable to the hot water outlet 122 in the tank 112, a hot water T outlet 164, and a hot water T siphon outlet 166.

For returning hot water HW to the multi-tubular structure 132, a transition tube 170 is provided. To accommodate the transition tube 170, an enlarged cold water tube portion 141 may be provided, and enlarged cold water tube portion 141 may have a larger outside diameter than cold water tube 140. The transition tube 170 having a hot water inlet 172 configured to receive a supply of hot water HW from the hot water T siphon outlet 166 and direct the supply of hot water HW to the hot water tube 150. The transition tube 170 includes (1) an inlet flange 173 which may be provided in an annular disk configuration having an outer radius (R) and an inner radius (r) so that it also serves as an orifice and may be fluidly sealed with respect to the hot water T siphon outlet 166, (2) a bend portion 174, and (3) a transition tube outlet 176. The transition tube 170 has interior sidewalls 178 defining a hot water receiving passageway 180 for receiving hot water HW from the hot water T siphon outlet 166 and delivering the hot water HW to the hot water tube 150.

As seen in FIGS. 3A and 4, in an embodiment, the multi-tubular structure 132 may be provided as a pair of concentric tubes (140 and 150) nested about the longitudinal axis B. In this embodiment, the hot water tube 150 provides a centrally located hot water passageway 156. The cold water tube 140 is spaced outwardly from the hot water tube 150 and provides an annular cold water passageway 181 between an outer wall 182 of the hot water tube 150 and an inner wall 184 of the cold water tube 140, from which cold water 145 is discharged.

In various embodiments, the multi-tubular structure 132 has a length $L_I$ inside the tank 112 (same parameters as shown in FIG. 2 apply) along the longitudinal axis B, and the length $L_I$ is greater than 50% of the inside height H of tank 112.

In various embodiments, the multi-tubular structure 132 has a length $L_I$ inside the tank 112 (same parameters as shown in FIG. 2 apply) along the longitudinal axis B, and the length $L_I$ is greater than 75% of the inside height H of tank 112.

In various embodiments, the multi-tubular structure 132 has a length $L_I$ inside the tank 112 (same parameters as shown in FIG. 2 apply) along the longitudinal axis A, and the length $L_I$ is greater than 90% of the inside height H of tank 12.

In various embodiments, the tank 112 may be provided as a cylindrical tank having an internal diameter D, and wherein height H is greater than diameter D.

In order to evaluate and confirm the advantages of a water heater design which incorporates a thermosiphon as taught herein, comparative testing was conducted at an accredited testing laboratory which is approved for United States Environmental Protection Agency Energy Star Testing. Two (2) water heaters were tested, each having a nominal fifty (50) gallon size, one water heater without, and one water heater with an internal thermosiphon as taught herein. All tests were conducted in accord with the procedures set out in the United States Code of Federal Regulations, as found at 10 C.F.R. Chapter II, Part. 430, Subpart B, Appendix E, entitled Uniform Test Method for Measuring Consumption of Water Heaters, which test procedures are incorporated herein in their entirety by this reference, as they existed on Mar. 22, 2016. A modified water heater having an internal thermosiphon as taught herein was tested, A modified fifty (50) gallon hot water heater, was provided for testing, Bradford White Model RE 350T1, Serial No. ME36250436. An unmodified hot water heater by the same manufacturer, Bradford White Model RE350T6, having Serial Number ME36218123 was also tested. Bradford White Corporation is a well-known manufacturer of hot water heaters, with corporate headquarters at 725 Talamore Drive, Ambler, Pa., 19002, United States of America. See http://www.bradford-white.com/ for more information.

The full test results for the unmodified water heater are set out in Appendix A. Comparative test results are set out in Table 1 below.

The full test results for a modified water heater using an internal thermosiphon system as taught herein are set out in Appendix B. Comparative test results are set out in Table 1 below.

TABLE 1

COMPARATIVE TEST RESULTS

| Item | Modified Water Heater | Unmodified Water Heater | Remarks |
| --- | --- | --- | --- |
| Tank Storage Volume[1] | 45.0 gallons | 45.0 gallons | |
| First Hour Rating | 79.6 gallons | 52.9 gallons | 26.7 gallons increase |
| Recovery Efficiency | 0.98 | 0.98 | Allowed by 10CFR Ch. II, 430(e) |
| Daily Energy Use | 42,196 BTUs | 44,892 BTUs | 2696 BTUs savings |
| Annual Energy Use | 15,402 BTU/yr or 4,514 kWh/yr | 16,544 BTU/yr or 4,849 kWh/yr | 335 kWh/yr savings |
| Energy Factor | 0.983 | 0.913 | Δ = 0.07 |

[1]Storage Tank water temperature was thermostatically maintained at 135° F. plus or minus 5° F.

The test results set out in Table 1 speak for themselves when viewed by one of ordinary skill in the art and to whom this specification is directed. It is clear that in otherwise identical water heaters of nominal fifty (50) gallon capacity, the use of a modified water heater as taught herein would save a homeowner 335 kilowatt hours per year in energy costs. While the savings may be modest to the individual homeowner (for example about US$28.47 per year if the cost of electricity is 8.5 cents per kwH), such savings would be appreciable if such devices were installed in homes of large segments of the population. As an individual water heater of the same size produces more hot water (a 26.7 gallon increase in the First Hour Rating) while using less energy, the advantages provided by way of use of the inventive internal thermosiphon hot water heater becomes quite clear. Further, since energy savings based on hot water usage as projected by the test criteria noted above amounts to some 335 kilowatt hours per year per hot water heater, each installed hot water heater using the inventive apparatus disclosed herein would save 0.335 megawatt of energy usage over a year. In more basic terms, the use of a hot water heater with internal thermosiphon as disclosed herein by approximately 2400 homes would save about 800 megawatts per year of power. Such energy savings could significantly contribute to reducing new energy generation capacity required to serve a growing population. Where fossil fuels such as natural gas, oil, or coal are used for electrical power generation, such electricity savings as would be achievable by widespread use of the inventive internal thermosiphon hot water heater as disclosed herein would contribute to considerable greenhouse gas generation reduction—simply by using more efficient hot water heaters.

Additionally, by using an embodiment of a thermosiphon in a hot water heater in accord with the teachings herein, biological growth in a residential hot water supply tank may be controlled or substantially eliminated. Such a method may be practiced by providing a hot water tank as set forth herein, then providing water to the hot water tank, and heating water in the hot water tank through conventional hot water heating equipment as may be normally supplied to residential hot water heaters. However, additionally, by circulating water in the hot water tank using a thermosiphon as set forth in one of the embodiments described herein, I have found that it is possible to substantially prevent vertical temperature stratification of water within a hot water tank. Consequently, by way of maintaining the temperature of the water in said tank above a selected temperature that inhibits or kills bacteria, it has been found that bacterial contamination is reduced or substantially eliminated. In an embodiment, setting the hot water temperature at about at about 180° F. may accomplish such a goal.

It is to be appreciated that my thermosiphonic systems for hot water heaters is an appreciable improvement in the art of energy efficient hot water heaters. My novel design addresses the problem of how to provide for either a "factory built" hot water tank including a thermosiphon for continuous recirculation of water in the tank, or a "field built" thermosiphon design for use with a conventional factory built hot water tank which has not been provided with a thermosiphon system built therein.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that my thermosiphon system for hot water tanks may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A thermosiphon sized and shaped for use in combination with a residential water heater having a tank with internal sidewalls defining an internal space of height H, the tank adapted to be filled with water for heating of the water, the tank having a top portion with (1) a cold water inlet of internal diameter $D_C$ and (2) a hot water outlet, said thermosiphon comprising:

a multi-tubular structure disposed along a longitudinal axis and having an outer diameter $D_T$, wherein said outer diameter $D_T$ is less than said diameter $D_C$ so that said multi-tubular structure is insertable through said cold water inlet into said tank, said multi-tubular structure including (a) a hot water tube extending between a siphon inlet and a siphon exit, said siphon exit adapted for discharge of water therefrom, and (b) a cold water tube, said cold water tube spaced outwardly from and situated longitudinally along at least a portion of said hot water tube, said cold water tube extending between a cold water inlet end having a cold water inlet, and a cold water output end which is open and adapted for discharge of water therefrom;

an external hot water tee, said external hot water tee having a hot water tee inlet fluidly attachable to said hot water outlet in said tank, a hot water tee outlet, and a hot water tee siphon outlet;

a transition tube, said transition tube having a hot water inlet configured to receive a supply of hot water from said hot water tee siphon outlet and direct the supply of hot water to said hot water tube, said transition tube comprising (1) an inlet flange fluidly sealed with respect to said hot water tee siphon outlet, (2) a bend portion, and (3) a transition tube outlet, said transition tube having interior sidewalls defining a hot water receiving passageway for receiving hot water from said hot water tee siphon outlet and delivering hot water to said hot water tube; and wherein the hot water tube and the cold water tube of said multi-tubular structure form a pair of concentric tubes nested about said longitudinal axis, wherein said hot water tube provides a centrally located hot water passageway, and wherein said cold water tube is spaced outwardly from said hot water tube and provides an annular cold water passageway between an outer wall of said hot water tube and an inner wall of said cold water tube.

2. The thermosiphon as set forth in claim 1, wherein said multi-tubular structure has a length $L_I$ inside said tank and along said longitudinal axis, and wherein said length $L_I$ is greater than 50% of said height H.

3. The thermosiphon as set forth in claim 1, wherein said multi-tubular structure has a length $L_I$ inside said tank and along said longitudinal axis, and wherein said length $L_I$ is greater than 75% of said height H.

4. The thermosiphon as set forth in claim 1, wherein said multi-tubular structure has a length $L_I$ inside said tank and along said longitudinal axis, and wherein said length $L_I$ is greater than 90% of said height H.

5. A method for controlling biological growth in a residential hot water supply tank, said method comprising:
  (a) providing a hot water tank, said hot water tank comprising[:]
  a tank with sidewalls defining an internal space of height H between a bottom portion and a top portion, the tank adapted to be filled with water, the tank comprising a cold water inlet in the top portion and a hot water outlet in the top portion;
  a thermosiphon, said thermosiphon located within said tank and including a multi-tubular structure disposed along a longitudinal axis, said a multi-tubular structure thermosiphon having (a) a cold water tube extending between an upstream end and a downstream end, said upstream end fluidly connected to said cold water inlet in said top portion, and said downstream end adapted for discharge of water therefrom within said tank, and (b) a hot watertube, said hot water tube spaced outwardly from and situated longitudinally along at least a portion of said cold watertube, said hot water tube extending between a hot water inlet end having a hot water inlet, and a hot water output end which is open and adapted for discharge of water therefrom, said hot water tube further comprising an inlet cap substantially sealed to said cold water tube adjacent said cold water inlet, wherein the hot water tube and the cold water tube of said multi-tubular structure form a pair of concentric tubes nested about said longitudinal axis, wherein said cold water tube provides a centrally located cold water passageway, and wherein said hot water tube is spaced outwardly from said cold water tube and provides an annular hot water passageway between said cold water tube and said hot water tube; and
  a hot water collection tee within said tank, said hot water collection tee including a tee inlet, a first outlet fluidly connected to said hot water outlet in said top portion, and a second outlet fluidly connected to said hot water inlet of said thermosiphon;
  wherein said multi-tubular structure has a length $L_I$ inside said tank and along said longitudinal axis, and wherein said length $L_I$ is greater than 75% of said height H;
  (b) providing water to said hot water tank;
  (c) heating water in said hot water tank; circulating water in said hot water tank with said thermosiphon, to thereby substantially prevent vertical temperature stratification of water within said hot water tank; and
  (d) maintaining the temperature of the water in said tank at about 180° F., or more.

6. The method as set forth in claim 5, wherein said hot water tank comprises a generally cylindrical tank having an internal diameter D, and wherein height H is greater than diameter D.

7. A method for controlling biological growth in a hot water tank, said method comprising:
  providing a hot water tank;
  providing a thermosiphon as set forth in claim 1;
  providing water to said hot water tank;
  heating water in said hot water tank;
  circulating water in said hot water tank with said thermosiphon to thereby substantially prevent vertical temperature stratification of water within said hot water tank; and
  maintaining the temperature of the water in said tank at about 180° F., or more.

8. The method as set forth in claim 7, wherein said hot water tank comprises a generally cylindrical tank having an internal diameter D, and wherein height H is greater than diameter D.

* * * * *

UNITED STATES PATENT AND TRADEMARK OFFICE
CERTIFICATE OF CORRECTION

PATENT NO. : 10,794,614 B2
APPLICATION NO. : 16/256281
DATED : October 6, 2020
INVENTOR(S) : Mottershead Page 1 of 7

It is certified that error appears in the above-identified patent and that said Letters Patent is hereby corrected as shown below:

In the Specification

Column 1, Line 11, after the words "Application Ser. No.", delete "62/351,469" and substitute therefore --62/351,169--.

Column 1, Line 46, after the words "it would be", delete "advantages" and substitute therefore --advantageous--.

Column 1, Line 14, after the words "includes, factory", delete "build" and substitute therefore --built--

Column 2, Line 16, after the words "apparatus design which", delete "is easily".

Column 2, Line 26, after the words "and which is sized and", delete "shape" and substitute therefore --shaped--.

Column 2, Line 34, after the words "heat recovery rate,", insert --and--.

Column 2, Line 67, after the words "biological growth", delete "in".

Column 2, Line 67, after the words "inside the", delete "tanks" and substitute therefore --tank--.

Column 4, Line 46, after the word "perspective", delete "of for" and insert --view of--.

Column 4, Line 48, after the words "conceptual vertical", delete "cross sectional" and substitute therefore --cross-sectional--.

Column 4, Line 49, after the words "in Fig. 1,", delete "where" and substitute therefore --wherein--.

Column 4, Line 58, after the word "perspective", delete "of for" and insert --view of--.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*

Column 5, Line 1, after the words "conceptual vertical", delete "cross sectional" and substitute therefore --cross-sectional--.

Column 5, Line 57, after the words "hot water tank", delete "10" and substitute therefore --12--.

Column 5, Line 67, after the words "The thermosiphon", insert --30--.

Column 6, Line 38, after the words "within the tank 12 of", insert --hot--.

Column 7, Line 4, after the words "The thermosiphon", insert --130--.

Column 7, Line 17, after the words "multi-tubular structure", insert --132--.

Column 10, Line 15, at the end of the specification, insert APPENDIX A and APPENDIX B as follows:

APPENDIX A

Test Results for

Standard

Unmodified Water Heater

- Nameplate Data

Automatic Storage Water Heater
  Bradford White Corporation (www.bradfordwhite.com)
  200 Lafayette St.
  Middleville, MI 49333

| | | |
  |---|---|---|
  | Model No. | : | RE350T6 |
  | S/N | : | ME36218123   D/N: 1NCWW |
  | Voltage | : | 240/208 V    1Phase AC Only, 50/60 Hz |
  | Upper Element | : | 4500/3500 Watts |
  | Lower Element | : | 4500/3500 Watts |
  | Maximum | : | 4500/3500 Watts |
  | Pressure Test | : | 300 (psi), Working: 150 (psi) |
  | Wattage rating based on 60 HZ | | |
  | Listing | : | •AHRI Certified |
  | | | •Intertek #4001576, ETL Listed Conforms to UL STD. 174 |

- Summary of Test Results

Storage Tank waster temperature was thermostatically maintained at 135 °F ± 5 °F

| | | |
  |---|---|---|
  | Tank Storage Volume | : | 45.0 gallons |
  | First Hour Rating | : | 52.9 gallons |
  | Recovery Efficiency | : | 0.98 (Allowed by 10CFR Ch II, 430(e)) |
  | Daily Energy Use | : | 44,892 Btu |
  | Annual Energy Use | : | 16,544 kBtu/yr or 4,849 kWh/yr |
  | Energy Factor | : | 0.913 |

50 GALLON BRADFORD WHITE WATER HEATER TEST RESULTS

MODEL: RE 350T6

S/N: ME36218123

* Water Heater was tested as received to 10CFR430(e). Storage tank water was heated to $135 \pm 5$ °F.

6.1.1    Storage Volume, $V_{st} = (546 - 172) \div 8.3 \simeq 45.0$ gal 6.1.2    First Hour Rating, $F_{hr} = 52.9$ gal 6.1.3    $\eta_r = 0.98$ (Immersed Heating Elements) – (Allowed by 10CFR, CH II, 430(e))

6.1.4    $Q_{hr} = \dfrac{781 \times 3.412 - \dfrac{[45.0 \times 8.21 \times 1.008 \times (129.8 - 134.7)]}{0.98}}{18.42}$ $= 245.79$ Btu/hr $UA = \dfrac{245.79}{129.5 - 67.5} \simeq 3.964$ Btu/hr °F 6.1.5    $Q_d = 12{,}719 \times 3.412 - \dfrac{45.0 \times 8.21 \times 1.008 \times (129.8 - 134.2)}{0.98}$ $\simeq 44{,}386$ Btu 6.1.6    $Q_{da} = 44{,}386 - [(129.6 - 67.4) - (135.0 - 67.5)] \times 3.964 \times 23.65$ $= 44{,}892$ Btu

| M, lb | : | 89.21 | 89.21 | 89.21 | 89.21 | 89.38 | 90.29 |
|---|---|---|---|---|---|---|---|
| ΔT, °F | : | 76.0 | 75.9 | 76.2 | 76.3 | 76.5 | 75.6 |
| $C_p$, Btu/lb, °F | : | 1.004 | 1.004 | 1.004 | 1.004 | 1.004 | 1.004 |
| $\eta_r$ | : | 0.98 | 0.98 | 0.98 | 0.98 | 0.98 | 0.98 |

$Q_{HW} \simeq 41{,}819$ Btu $Q_{HW77} = 42{,}253$ Btu $Q_{HWD} = 42{,}253 - 41{,}819 \simeq 434$ Btu $Q_{dm} = 44{,}892 + 434 = 45{,}326$ Btu 6.1.7    $E_f = \dfrac{41{,}408}{45{,}326} \simeq 0.914$ 6.1.8    $E_{annual} = \dfrac{365 \times 45{,}326}{10^3} = 16{,}544$ kBtu/yr or $4{,}849$ kWh/yr

APPENDIX B

Test Results

For

Modified Water Heater

With

Internal Thermosiphon

- Nameplate Data:

Automatic Storage Water Heater
  Bradford White Corporation (www.bradfordwhite.com)
  200 Lafayette St.
  Middleville, MI 49333

| | | |
  |---|---|---|
  | Model No. | : | RE350T6 |
  | S/N | : | ME36250436  D/N: –1NCWW |
  | Capacity | : | 50 (gal) / 189.3 (liters) |
  | Voltage | : | 240/208    1Phase AC Only, 50/60 Hz |
  | Upper Element | : | 4500/3500 Watts |
  | Lower Element | : | 4500/3500 Watts |
  | Maximum | : | 4500/3500 Watts |
  | Pressure Test | : | 300 (psi), Working: 150 (psi) |
  | Wattage rating based on 60 HZ | | |
  | Listing | : | •AHRI Certified |
  | | | •ETL Listed, Conforms to UL STD. 174, Intertek #4001576 |

- Summary of Test Results

Storage Tank water temperature was thermostatically maintained at 135 °F ± 5 °F

| | | |
  |---|---|---|
  | Tank Storage Volume | : | 45.0 gallons |
  | First Hour Rating | : | 79.6 gallons |
  | Recovery Efficiency | : | 0.98 (Allowed by 10CFR Ch II, 430(e)) |
  | Daily Energy Use | : | 42,196 Btu |
  | Annual Energy Use | : | 15,402 kBtu/yr or 4,514 kWh/yr |
  | Energy Factor | : | 0.983 |

MODIFIED 50 GALLON BRADFORD WHITE WATER HEATER TEST RESULTS

MODEL: RE 350T6

S/N: ME36250436

- Water Heater was tested as received to 10CFR430(e). Storage tank water was heated to $135 \pm 5$ °F.

6.1.1 Storage Volume, $V_{st} = (549 - 176) \div 8.3 \simeq 45.0$ gal 6.1.2 First Hour Rating, $F_{hr} = 79.6$ gal 6.1.3 $\eta_r = 0.98$ (Immersed Heating Elements) – (Allowed by 10CFR, CH II, 430(e))

6.1.4 $Q_{hr} = \dfrac{677 \times 3.412 - \dfrac{[45.0 \times 8.21 \times 1.008 \times (127.7 - 139.8)]}{0.98}}{18.5}$ = 373.405 Btu/hr $UA = \dfrac{373.405}{134.0 - 66.5} \simeq 4.643$ Btu/hr °F 6.1.5 $Q_d = 10{,}929 \times 3.412 - \dfrac{45.0 \times 8.21 \times 1.008 \times (127.7 - 137.2)}{0.98}$ $\simeq 40{,}900$ Btu 6.1.6 $Q_{da} = 40{,}900 - [(134.6 - 66.6) - (135.0 - 67.5)] \times 4.643 \times 23.65$ = 40,845 Btu

| M, lb | : | 89.21 | 89.13 | 89.13 | 89.13 | 89.13 | 89.21 |
|---|---|---|---|---|---|---|---|
| ΔT, °F | : | 74.9 | 72.8 | 75.7 | 75.5 | 75.3 | 73.6 |
| $C_p$, Btu/lb, °F | : | 1.004 | 1.004 | 1.004 | 1.004 | 1.004 | 1.004 |
| $\eta_r$ | : | 0.98 | 0.98 | 0.98 | 0.98 | 0.98 | 0.98 |

$Q_{HW} \simeq 40{,}902$ Btu $Q_{HW77} = 42{,}253$ Btu $Q_{HWD} = 42{,}253 - 40{,}902 \simeq 1{,}351$ Btu $Q_{dm} = 40{,}845 + 1{,}351 = 42{,}196$ Btu 6.1.7 $E_f = \dfrac{41{,}408}{42{,}196} = 0.9813$ 6.1.8 $E_{annual} = \dfrac{365 \times 42{,}196}{10^3} = 15{,}402$ kBtu/yr or 4,514 kWh/yr

CERTIFICATE OF CORRECTION (continued)
U.S. Pat. No. 10,794,614 B2

In the Claims

Column 10, Line 64, delete "multi -tubular" and substitute therefore --multi-tubular--.

Column 11, Line 10, after the word "comprising", delete "[:]".

Column 11, Line 20, delete "thermosiphon".

Column 11, Line 25, after the words "(b) a hot", delete "watertube,", and substitute therefore --water tube,--.

Column 11, Line 27, after the words "of said cold", delete "watertube,", and substitute therefore --water tube,--.

Column 12, Line 17, after the words "at about 180°" delete "F.," and substitute therefore --F,--.

Column 12, Line 33, after the words "about 180°" delete "F.," and substitute therefore --F,--.